United States Patent Office 3,473,894
Patented Oct. 21, 1969

3,473,894
PREPARATION OF HEXAGONAL BORON NITRIDE
Albert Babl and Heinz Josef Geng, Waldshut, Baden, Germany, assignors to Lonza-Werke G.m.b.H., Weil am Rhine, Germany
No Drawing. Filed Mar. 9, 1967, Ser. No. 621,799
Claims priority, application Switzerland, Mar. 9, 1966, 3,377/66
Int. Cl. C01b 21/06; C01c 1/08
U.S. Cl. 23—191                                                7 Claims

ABSTRACT OF THE DISCLOSURE

Hexagonal boron nitride is prepared in a one-step process by heating a dry mixture of an oxygen-containing boron compound and an organic nitrogen-containing compound with an alkaline earth metal nitride catalyst in an inert atmosphere to 1600 to 2100° C.

---

This invention relates to the production of hexagonal boron nitride.

Hexagonal boron nitride is a difficultly fusible refractory material having particular electric and lubricating properties and receives increasing interest from industry.

It is known to prepare boron nitride from oxygen-containing boron compounds and ammonia at temperatures of 700 to 1100° C. in the presence of an inert high melting highly voluminous diluent, such as calcium phosphate. The diluting agent must then be washed out of the reaction mixture with an acid. The obtained boron nitride is unstable and its lattice arrangement is not clearly defined (German 1,153,731).

Patent No. 3,189,412 discloses a process to prepare boron nitride by passing nitrogen or ammonia or another nitrogen-providing gas at 1200 to 1600° C. over a mixture comprising boric oxide, boric acid, or another boric oxide providing substance, carbon, and a catalyst, treating the reaction mixture with dilute mineral acid, and separating the boron nitride. This process in which the preferred catalyst is $MnO_2$ produces high yields, particularly at temperatures of 1400° C. However, the obtained boron nitride is contaminated with the carbon of the starting mixture and constitutes an X-ray amorphous product which must be converted to crystalline hexagonal boron nitride in an additional step.

It is a principal object of this invention to provide a single step process for the production of hexagonal boron nitride.

Other objects and advantages will be apparent from a consideration of the specification and claims.

In accordance with the invention, an oxygen-containing boron compound is mixed with an organic nitrogen-containing compound; the mixture is dried at a temperature of 110 to 350° C., an alkaline earth metal nitride is added as a catalyst, and the thus obtained mixture is heated to a temperature of 1600 to 2100° C., preferably 1700 to 2000° C., and maintained at the final temperature for 5 to 90 minutes. The cooled reaction product is comminuted and subjected to a treatment with water. Finally, the boron nitride filtered after the water treatment is dried.

In a preferred embodiment of the invention, the catalyst containing reaction mixture is compressed under a pressure of 100 to 2000 kg./cm.$^2$ to shaped bodies which are subjected to the reaction.

Suitable oxygen-containing boron compounds are boric acid, boron oxide, and boric oxide providing substances. We prefer to use boric acid ($H_3BO_3$). Suitable organic nitrogen-containing compounds are particularly melamine, urea, and dicyanodiamide. Preferred alkaline earth metal nitrides used as catalysts are magnesium or calcium nitride.

The starting materials are mixed in the dry state in a proportion of 1 mole of the boron compound, calculated as $B_2O_3$, to 2 to 6, preferably 4 to 5, gram atoms of nitrogen of the employed organic nitrogen-containing compound. The starting materials are used in powdery form, whereby the grain size is not critical.

Subsequently, the mixture is dried at temperatures of 110 to 350° C., preferably 150 to 250° C. During drying, small losses of nitrogen take place.

The drying operation can be carried out in air or in a nitrogen or ammonia atmosphere. The drying time depends on the drying temperature and also on whether the drying step is performed in a static atmosphere or with circulating air or gas. In the latter case, considerably shortened times may be used. In a static atmosphere, about four hours are sufficient for drying at a temperature of 210° C., and ten hours at 150° C.

The dried material is then crushed or ground whereby conventional mills like roller mills, cross beater mills, rolling discs and the like can be employed.

It has been found advantageous to add the catalyst already prior to the comminuting step and to carry out said step with exclusion of moisture. In this way, a good distribution of the catalyst in the mixture is ensured. Preferably, the catalyst is added in an amount of 0.2 to 10 percent by weight, calculated on the starting materials.

The reaction mixture is heated to the reaction temperature preferably within 10 to 15 minutes though slower heating rates do not do any harm. A preliminary reaction takes place during the heating-up period. The crystalline boron nitride forms at reaction temperature. The period for which the reaction mixture must be kept at reaction temperature, depends on the height of the temperature. The higher the reaction temperature, the lower the reaction times. At low temperatures, e.g. at 1600° C., the mixture should be maintained at reaction temperature for 60 to 90 minutes; at high temperatures, e.g. at 1900 to 2000° C., 5 to 10 minutes are sufficient.

Heating is carried out in an inert gas atmosphere, e.g. nitrogen or argon, preferably in a gentle current of nitrogen. In this way, the gases and vapors developed in the reaction such as water vapor, $CO_2$, $NH_3$, as well as the substances which are volatile at reaction temperature, are removed from the reaction space.

The process of the invention can be carried out as a batch process or continuously, whereby the reaction mixture is introduced as a loose powder or a compacted mass into the reaction vessel, which is preferably of graphite. When not compressed material is used, it is advantageous to cover the reaction vessel with a perforated lid. Compressed bodies of the reaction mixture may be brought to reaction without a specific container, e.g. by passing the same continuously through a shaft oven. In a continuous operation of the process, e.g. in an inclined rotary or shaft kiln, care must be taken to maintain the rate of heating and the residence times within the limits stated hereinabove.

The reaction product is cooled and comminuted, and the ground product is subjected to a water treatment, preferably with water having a temperature of 90 to 95° C. This step is carried out preferably with stirring for 30 to 60 minutes. The obtained sludge is filtered, and the filtered boron nitride is dried at a temperature of about 105° C. If necessary or desired, the product is then again comminuted. The weight loss in the water treatment is about 0.5 to 2 percent. X-ray determination shows the produced boron nitride to be a very well crystallized hexagonal boron nitride.

The following examples are given to illustrate the invention.

EXAMPLE 1

495 g. of boric acid ($H_3BO_3$) and 336 g. of dicyanodiamide were mixed as powders in the dry state and were then dried in a procelain dish in a drying cabinet for 5 hours at a temperature of 190° C. The mixture sintered to a porous cake and showed a weight loss of 24.4%. This loss was caused by splitting off water from the boric acid and conversion to metaboric acid ($HBO_2$).

The caked mixture was crushed and, after admixture of 0.5% of calcium nitride ($Ca_3N_2$), ground to a fineness of 0.2 mm. in a laboratory vibrating mill. From this mixture, 250 g., without additional binder, were compressed to bars of 100 mm. length, 12 mm. width, and 8 to 12 mm. thickness. The applied compacting pressure was 1000 kg./cm.$^2$. The bars were heated in nitrogen atmosphere within 60 minutes to 1850° C. and maintained at said temperature for 20 minutes.

The resulting boron nitride (66.7 g.) had a white to a weakly greenish-white color. The nitrogen content was 55.8%. The compressed bars were comminuted, and the finely ground boron nitride was washed with water of 90° C. Thereby, a weight loss of 0.4% was observed. The X-ray diffraction pattern of the material was that of a well crystallized hexagonal boron nitride.

The yield, calculated on boric acid, was 85.3 percent.

EXAMPLE 2

As in Example 1, 495 g. of boric acid and 336 g. of dicyanodiamide were dry-mixed and dried in a drying cabinet at 210° C. for 4 hours. After drying, the porous sintered cake was comminuted to a grain size of 10 mm., and 1% of magnesium nitride was added; 200 g. of this raw mixture were placed in graphite crucibles, and the crucibles were covered with perforated lids. The crucibles were heated in a nitrogen atmosphere within 25 minutes to 1750° C. and maintained for 20 minutes at said temperature. After cooling and washing, 40 g. of white hexagonal boron nitride were obtained. Yield: 66.3%.

EXAMPLE 3

154.6 g. of boric acid and 150.0 g. of urea were mixed and dried at 190° C. for 8 hours. On weighing, a loss of 52.7% by weight was found. 90 g. of said mixture were ground with 1% by weight of calcium nitride (finer than 0.5 mm. particle size) and compressed under a pressure of 500 kg./cm.$^2$. The compressed shapes were placed in a graphite crucible, heated within 60 minutes in a nitrogen atmosphere to 1750° C., and maintained at said temperature for 25 minutes. After cooling, comminuting, and washing, 30.4 g. of white hexagonal boron nitride in a yield of 97.5%, calculated on boric acid, were obtained.

We claim:

1. A process for producing hexagonal boron nitride which comprises mixing an oxygen-containing boron compound with an organic nitrogen-containing compound, drying the mixture at a temperature of 110 to 350° C., adding an alkaline earth metal nitride as catalyst, heating the mixture in an inert atmosphere to a temperature in the range of 1600 to 2100° C., maintaining the mixture at said temperature for a period of 5 to 90 minutes, cooling, comminuting the cooled reaction product, subjecting the same to a treatment with water, filtering the obtained hexagonal boron nitride, and drying.

2. The process as claimed in claim 1 comprising compressing the catalyst-containing mixture under a pressure of at least 100 kg./cm.$^2$ to shapes before the mixture is heated.

3. The process as claimed in claim 1 wherein said oxygen-containing boron compound is boric acid.

4. The process as claimed in claim 1 wherein said organic nitrogen-containing compound is dicyanodiamide.

5. The process as claimed in claim 1 wherein 2 to 5 gram atoms nitrogen are applied per mole of $B_2O_3$.

6. The process as claimed in claim 1 wherein said alkaline earth metal nitride is a member of the group consisting of calcium nitride and magnesium nitride and is used in an amount of 0.2 to 10 percent by weight, calculated on the reaction mixture.

7. The process as claimed in claim 1 wherein said inert atmosphere is nitrogen.

References Cited

UNITED STATES PATENTS

| | | | |
|---|---|---|---|
| 1,157,271 | 10/1915 | Weintraub | 23—191 |
| 2,922,699 | 1/1960 | Lauzau | 23—191 |
| 3,058,809 | 10/1962 | Taylor | 23—191 |
| 3,150,929 | 9/1964 | Wentore | 23—191 |
| 3,189,412 | 6/1965 | Wood et al. | 23—191 |
| 3,261,667 | 7/1966 | O'Connor | 23—191 |

OTHER REFERENCES

Colburn, C. B.: Developments in Inorganic Nitrogen Chemistry; Elseview Publishing Co.; London and New York, 1966 vol. 1, p. 492.

OSCAR R. VERTIZ, Primary Examiner

G. O. PETERS, Assistant Examiner